US012583396B2

(12) United States Patent
Wardell

(10) Patent No.: US 12,583,396 B2
(45) Date of Patent: Mar. 24, 2026

(54) MULTI-FUNCTIONAL AND MODULAR FLAG POST DEVICE

(71) Applicant: Garrett Wardell, Albuquerque, NM (US)

(72) Inventor: Garrett Wardell, Albuquerque, NM (US)

( * ) Notice: Subject to any disclaimer, the term of this patent is extended or adjusted under 35 U.S.C. 154(b) by 25 days.

(21) Appl. No.: 18/822,588

(22) Filed: Sep. 3, 2024

(65) Prior Publication Data

US 2025/0196779 A1     Jun. 19, 2025

Related U.S. Application Data

(60) Provisional application No. 63/609,471, filed on Dec. 13, 2023.

(51) Int. Cl.
| | |
|---|---|
| *B60R 9/06* | (2006.01) |
| *F16M 13/02* | (2006.01) |
| *F21V 33/00* | (2006.01) |
| *G09F 17/00* | (2006.01) |
| *F21Y 115/10* | (2016.01) |

(52) U.S. Cl.
CPC .............. *B60R 9/06* (2013.01); *F16M 13/02* (2013.01); *F21V 33/0004* (2013.01); *G09F 17/00* (2013.01); *F21Y 2115/10* (2016.08); *G09F 2017/0058* (2013.01); *G09F 2017/0075* (2013.01)

(58) Field of Classification Search
CPC .. B60R 9/00; B60R 9/06; F16M 13/02; F21V 33/0004; G09F 17/00; G09F 2017/0058; G09F 2017/0075; F21Y 2115/10
See application file for complete search history.

(56) References Cited

U.S. PATENT DOCUMENTS

| | | | | |
|---|---|---|---|---|
| 5,129,559 | A | * 7/1992 | Holliday | B60R 9/10 |
| | | | | 224/485 |
| 6,295,945 | B1 | 10/2001 | Amanze | |
| 6,808,098 | B1 * | 10/2004 | Bickett, III | B60D 1/36 |
| | | | | 116/28 R |
| 9,159,254 | B2 | 10/2015 | Oyoung | |
| 9,189,980 | B2 * | 11/2015 | Kidd | G09F 17/00 |
| D756,890 | S * | 5/2016 | Krebsbach | D12/406 |
| 11,176,852 | B2 * | 11/2021 | Mosby | G09F 17/00 |

(Continued)

FOREIGN PATENT DOCUMENTS

| | | | | |
|---|---|---|---|---|
| WO | WO-0234568 A1 * | 5/2002 | | B60Q 1/2657 |

*Primary Examiner* — Eret C Mcnichols
(74) *Attorney, Agent, or Firm* — Brennan, Manna & Diamond, LLC

(57) ABSTRACT

A versatile and secure flag post system designed for attachment to vehicle hitches, home exteriors, or ground staking is disclosed. The device includes an adjustable level hitch with a bottom side welded coupling, interconnected threaded pipes, and additional couplings facilitating secure attachment. The system also includes attachment loops for flag attachment, small pin tubular lock cylinders for enhanced security, and an ornamental top piece. The system offers various configurations, including a truck bed rack for carrying items or mounting tents, and a building mount with LED plasma cut brackets for visual appeal. The ground stake version provides a stable anchor with large stakes and API couplings. The mountable version uses durable metal clamps for attaching to solid structures.

14 Claims, 8 Drawing Sheets

(56) References Cited

U.S. PATENT DOCUMENTS

| | | | | |
|---|---|---|---|---|
| 11,230,231 | B1 | 1/2022 | Storer, II | |
| D962,130 | S * | 8/2022 | Huang | D12/162 |
| 11,849,821 | B2 * | 12/2023 | Tai | A45B 11/00 |
| 2003/0071185 | A1 * | 4/2003 | Casapulla | A01K 97/10 |
| | | | | 248/534 |
| 2005/0133556 | A1 * | 6/2005 | Bolin | B60R 9/065 |
| | | | | 224/509 |
| 2006/0053667 | A1 * | 3/2006 | Andersen | G09F 21/04 |
| | | | | 224/521 |
| 2008/0073398 | A1 * | 3/2008 | Plaschka | B60R 9/06 |
| | | | | 224/532 |
| 2012/0210930 | A1 * | 8/2012 | Lupoff | G09F 21/04 |
| | | | | 116/173 |
| 2012/0318189 | A1 | 12/2012 | Oyoung | |
| 2014/0014023 | A1 * | 1/2014 | Kidd | G09F 17/00 |
| | | | | 116/173 |
| 2015/0274086 | A1 * | 10/2015 | Moak | G09F 21/04 |
| | | | | 296/37.6 |
| 2015/0294605 | A1 | 10/2015 | Conway | |
| 2021/0221299 | A1 * | 7/2021 | Layton | G09F 17/00 |
| 2023/0066223 | A1 * | 3/2023 | Ruff | B62D 63/04 |
| 2023/0290283 | A1 * | 9/2023 | Kasanjian-King | G09F 21/04 |
| 2025/0148943 | A1 * | 5/2025 | Flores | G09F 17/00 |

* cited by examiner

MULTI-FUNCTIONAL AND MODULAR FLAG POST DEVICE

CROSS-REFERENCE TO RELATED APPLICATION

The present application claims priority to, and the benefit of, U.S. Provisional Application No. 63/609,471, which was filed on Dec. 13, 2023, and is incorporated herein by reference in its entirety.

FIELD OF THE INVENTION

The present invention generally relates to the field of flag display systems. More specifically, the present invention relates to a novel flag post system designed for versatile use on vehicle or trailer ball hitch receiver, fixed structures, or ground staking. The system is adapted to securely hold and display flags, offering easy assembly and enhanced stability. The flag post can be customized with various accessories and includes security features to prevent theft. It provides a simple and convenient method for users to display flags in multiple settings, ensuring that the flags are prominently and securely showcased whether on a vehicle, at home, or in an outdoor environment. Accordingly, the present disclosure makes specific reference thereto. Nonetheless, it is to be appreciated that aspects of the present invention are also equally applicable to other like applications, devices, and methods of manufacture.

BACKGROUND

By way of background, standard ball hitches on vehicles are traditionally limited to a single function of towing a vehicle. The singular utility of standard ball hitches leaves vehicle owners seeking alternative ways to make use of their ball hitch. Many individuals like to install traditional flag poles, posts on their vehicles but do not have a convenient way of installing. Additionally, traditional flag poles, posts, and other related accessories tend to be flimsy and lack durability, particularly when exposed to outdoor elements. This results in frequent replacements and maintenance, which can be inconvenient and costly. Also, flying a flag on a vehicle or at home typically requires multiple tools and a complex installation process, deterring many potential users. Individuals are required to purchase different types of poles for different locations such as wall of a building, farm, vehicle, and more. Individuals desire a robust, multifunctional, and easy-to-install flag post system.

Therefore, there exists a long felt need in the art for a versatile flag post system that can be attached to a vehicle's ball hitch or mounted on various structures. There is also a long felt need in the art for a durable and secure flag post that can withstand outdoor conditions without frequent maintenance or replacement. Additionally, there is a long felt need in the art for a flag post system that is easy to install and does not require multiple tools, making it user-friendly for vehicle owners and homeowners alike. Moreover, there is a long felt need in the art for a multifunctional flag post that can be customized and extended for various uses, including displaying multiple flags and other accessories. Further, there is a long felt need in the art for a flag post system that provides additional security features to prevent theft and ensure stability during use. Finally, there is a long felt need in the art for a flag post system that offers a simple, convenient, and effective method of flying flags on vehicles, at home, or staked in the ground.

The subject matter disclosed and claimed herein, in one embodiment thereof, comprises a versatile flag post system for attachment to a vehicle's ball hitch or mounting on various structures. The system features an adjustable level hitch adapted to be detachably attached to a vehicle, with a bottom side welded black API coupling secured to the hitch for stable foundation. API coupling refers to an internally threaded cylinder for joining two lengths of threaded pipe. The flag post includes a plurality of interconnected threaded pipes, each pipe being inner-threaded to attach to the next pipe above, and additional couplings facilitate outer threading for securing the pipes together. Two eye holes are positioned on the bottom black API coupling, aligning to enable a large master lock to secure the bottom pipe. Small pin tubular lock cylinders lock each coupling and pipe, operable with a tubular key for additional security. Welded rope loops are fastened to each pipe, enabling an anchor shackle to pass through for flag attachment. An ornamental top piece with a ¾" male threading adds an aesthetic touch.

In this manner, the versatile flag post system of the present invention accomplishes all of the foregoing objectives and provides users with a novel solution for displaying flags. The system enables for secure attachment to a vehicle's ball hitch or various structures, offering flexibility for different settings such as vehicles, homes, or outdoor areas. The robust construction ensures durability and stability, even in adverse weather conditions. The modular design with interconnected threaded pipes and couplings makes assembly and disassembly straightforward, without requiring multiple tools. The inclusion of welded rope loops and anchor shackles provides reliable points for flag attachment, ensuring the flags remain secure. The small pin tubular lock cylinders offer enhanced security, preventing theft and unauthorized disassembly. Additionally, the ornamental top piece adds an aesthetic element, enabling for customization. This flag post system helps maintain an organized and visually appealing display, whether on a vehicle, in a yard, or staked into the ground.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle or trailer ball hitch receiver flag post device. The device comprises an adjustable level hitch adapted to be detachably attached to a vehicle, a bottom side welded black API coupling secured to the adjustable level hitch, a flag post comprising a plurality of interconnected threaded pipes, each pipe being inner-threaded to attach to the next pipe above, additional couplings facilitating outer threading for securing the pipes together, two eye holes positioned a few inches apart on the bottom black API coupling enabling a large master lock to be threaded through both eye holes, a plurality of small pin tubular lock cylinders each locking a coupling and corresponding pipes, operable with a tubular key, a plurality of welded rope loops each fastened to a corresponding pipe, enabling an anchor shackle to be passed therethrough for securing flags, and an ornamental top piece.

In yet another embodiment, a flag display system for attachment to a vehicle hitch or home exterior is disclosed. The system includes a plurality of black API couplings, a plurality of threaded pipes, a waterproof LED light disposed in the center of the hitch coupling, adapted to illuminate plasma cutouts, a pair of eye holes enabling a padlock to loop through and lock both ends of the bottom pipe to the base of the hitch, a plurality of welded rope loops disposed on the threaded pipes for attaching or receiving an anchor shackle, a plurality of lock cylinders adapted to secure the couplings to the pipes, and the plurality of letter plasma cutouts are disposed in the threaded pipes and are illuminated by the LED light.

In another embodiment, a flag post for truck bed rack is disclosed. The flag post comprises a ¾ bottom side welded black API coupling welded to the bottom center of an adjustable level hitch, a plurality of additional couplings functioning as joints for attaching ¾"×24" threaded pipes in various configurations, couplings used on the ends of ¾"× 12" threaded pipes for forming a frame, a plurality of ¾" threaded pipe tees connecting 12" and 24" ¾" threaded pipes vertically and horizontally, a plurality of ¾" black threaded nipples connecting the threaded pipe tees, and a spare tire mount carrier featuring a bolt pin for attachment and detachment of a spare tire.

In another aspect, a flag post device for building a mounting is disclosed. The flag post device includes a bracket mount with LED plasma cut bracket, designed for positioning on a building wall, a black API coupling integrated with a Glock Pistol design, welded within the barrel of the Glock, a flag post comprising a plurality of threaded pipes, welded rope loops disposed below each black API coupling for secure attachment of flags, an ornamental top piece, and a plurality of anchor shackle pin tubular lock cylinders for attaching flags to the flag post.

In yet another aspect, a ground stake flag post device is disclosed. The flag post device includes a pair of large stakes, at least one ¾" bottom side welded black API coupling, a flag post formed by the interconnected threaded pipes, and anchor shackle pin tubular lock cylinders for securely attaching a flag to the flag post.

In still another embodiment, a mountable flag post device is disclosed. The flag post device comprises a plurality of metal clamps for mounting the flag post to solid structures or posts, each clamp made of durable aluminum and designed to withstand high winds, each clamp including a pair of apertures adapted to receive fasteners for securing the flag post, the flag post mountable to various structures such as gates, fences, or other solid surfaces, the flag post comprising interconnected threaded pipes and black API couplings, and a plurality of welded rope loops for attaching flags via anchor shackles and pin tubular lock cylinders.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
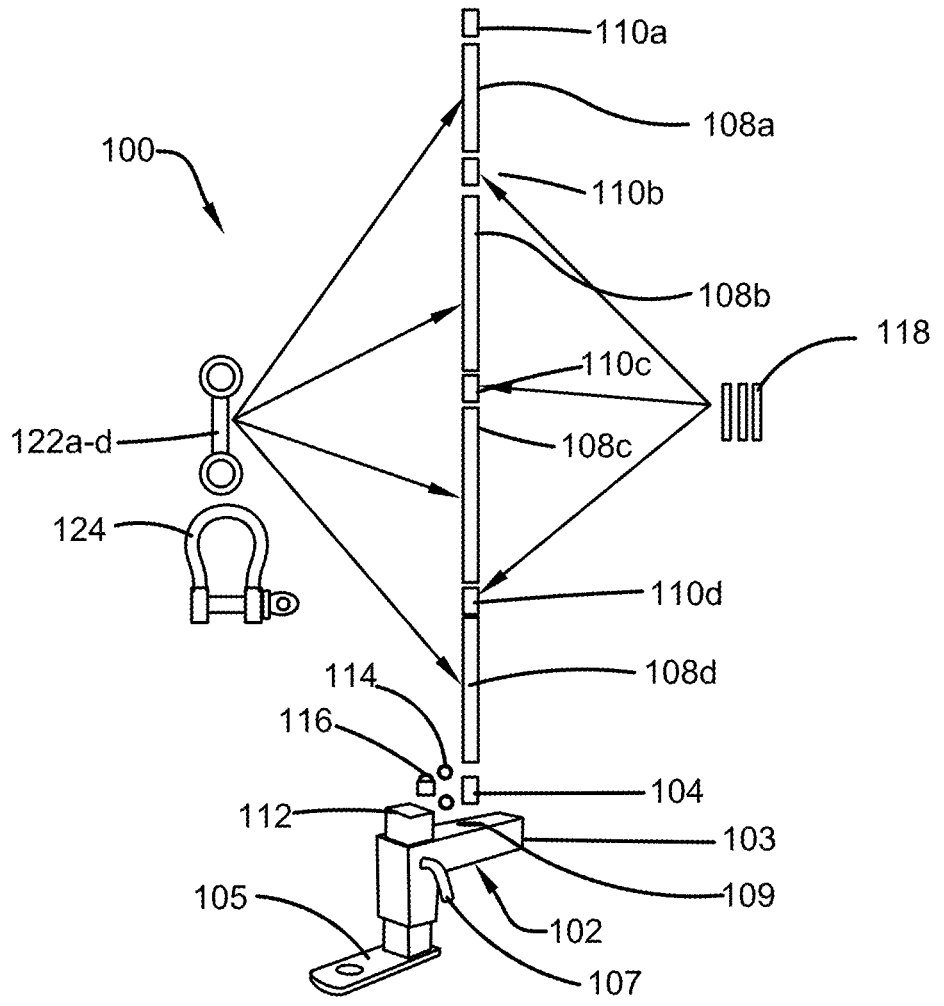
FIG. 1 illustrates a perspective view of one potential embodiment of the vehicle or trailer ball hitch receiver flag post of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a versatile flag post system that can be attached to a vehicle's ball hitch or mounted on various structures. There is also a long felt need in the art for a durable and secure flag post that can withstand outdoor conditions without frequent maintenance or replacement. Additionally, there is a long felt need in the art for a flag post system that is easy to install and does not require multiple tools, making it user-friendly for vehicle owners and homeowners alike. Moreover, there is a long felt need in the art for a multifunctional flag post that can be customized and extended for various uses, including displaying multiple flags and other accessories. Further, there is a long felt need in the art for a flag post system that provides additional security features to prevent theft and ensure stability during use. Finally, there is a long felt need in the art for a flag post system that offers a simple, convenient, and effective method of flying flags on vehicles, at home, or staked in the ground.

The present invention, in one exemplary embodiment, is a mountable flag post device. The flag post device comprises a plurality of metal clamps for mounting the flag post to solid structures or posts, each clamp made of durable aluminum and designed to withstand high winds, each clamp including a pair of apertures adapted to receive fasteners for securing the flag post, the flag post mountable to various structures such as gates, fences, or other solid surfaces, the flag post comprising interconnected threaded pipes and black API couplings, and a plurality of welded rope loops for attaching flags via anchor shackles and pin tubular lock cylinders.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of one potential embodiment of the vehicle or trailer ball hitch receiver flag post of the present invention in accordance with the disclosed structure. The vehicle or trailer ball hitch receiver flag post 100 of the present invention is designed as an improved ball hitch and flag post that attaches to the vehicle or trailer ball hitch receiver. More specifically, the device 100 enables users to customize the look of the hitch and display a flag and other accessories. The combined ball hitch and flag post device 100 includes an adjustable level hitch 102 which is adapted to be detachably attached to a vehicle. The adjustable level hitch 102 having a hitch receiving portion 103 and an adjustable height ball receiving portion 105. A pin 107 enables securement of the hitch receiving portion 103 to the adjustable height ball receiving portion 105. A bottom side welded black API coupling 104 is secured to the adjustable level hitch 102 of the vehicle. The bottom side welded black API coupling 104 is preferably welded or fastened securely to an aperture 109 in the hitch receiving portion 103 to provide a stable foundation for the flag post.

The flag post 106 includes a plurality of threaded pipes 108a-d wherein the threaded pipes are interconnected, with each pipe being inner-threaded to attach to the next pipe above thereon. The additional couplings 110a-d facilitate outer threading for securing the pipes 108a-d together. Two eye holes 112, 114 are positioned a few inches apart on the bottom black API coupling 104. The eye holes 112, 114 are designed to align when the bottom pipe 108d is turned, enabling a large master lock 116 to be threaded through both eye holes 112, 114. The eye holes 112, 114 secure the threaded pipe 108d, preventing the bottom pipe 108d from being unthreaded while the vehicle is in motion or from being stolen.

The padlock or large master lock 116 secures the flag post 106 by locking the flag post eye hole 112 to the hitch coupling eye hole 114, providing a security measure to prevent theft of the flag post 106. For providing security to the upper couplings 110a-c, the device 100 includes a plurality of small pin tubular lock cylinders 118 wherein each small pin tubular lock cylinder locks the coupling and corresponding pipes and is opened using tubular key 120. The post 106 cannot be disassembled without the key 120, thereby providing an additional security layer including securing the ornament at the top of the post.

The device 100 includes a plurality of welded rope loops 122a-d. Each loop 122a-d is fastened to a corresponding pipe 108a-d respectively and each loop enables an anchor shackle 124 to be passed therethrough. In the preferred embodiment, each loop is positioned below a corresponding coupling on the threaded pipe, the loops provide attachment points for securing flags. Each anchor shackle 124 is designed to hold the grommets of flags and one anchor shackle corresponding to each loop 122a-d is disposed. An optional tubular lock cylinder (not shown) can be disposed within the anchor shackle secures the flags in place.

Figure 2:
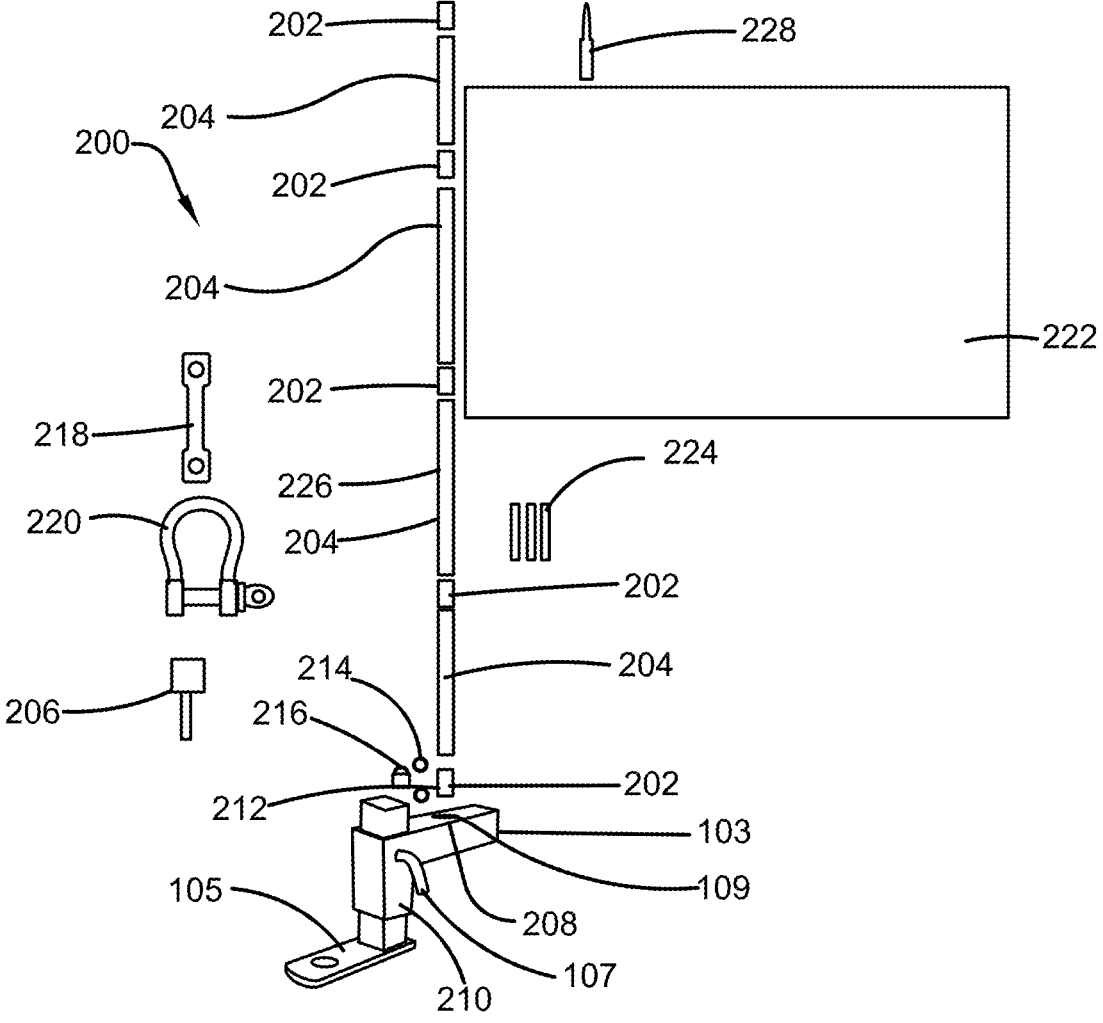
FIG. 2 illustrates a perspective view of another embodiment of the vehicle or trailer ball hitch receiver flag post of the present invention in accordance with the disclosed structure.

FIG. 2 illustrates a perspective view of another embodiment of the vehicle or trailer ball hitch receiver flag post of the present invention in accordance with the disclosed structure. In the present embodiment, the hitch flag post 200 is a versatile and secure flag display system designed for attachment to a vehicle hitch or home exterior. The device 200 includes a plurality of black API couplings 202, each coupling 202 is preferably a ¾" bottom side welded black API coupling. Each coupling 202 is preferably welded to the top of a ¾ inch threaded pipe 204 and each pipe 204 is about 12 inches in length. The length of each pipe 204 can be extended using an extender pipe (not shown).

A waterproof LED light 206 is disposed into the center 208 of the hitch coupling 210 and is adapted to illuminate the plasma cutouts. The LED light 206 is preferably attached to the vehicle's trailer lights plug using a dual-ended adapter. The device 200 includes a pair of eye holes 212, 214 to enable a padlock 216 to loop through and lock both ends of the bottom pipe to the base of the hitch 210. The padlock 216 is used to lock the flag post to the hitch coupling 210.

A plurality of welded rope loops 218 are disposed on the threaded pipes 204 and each is adapted for attaching or receiving an anchor shackle 220. The anchor shackle 220 holds the grommets of the flag 222. A plurality of lock cylinders 224 are adapted to secure the ¾ inch couplings 202 to the pipes 204. Preferably, four PTLCs are used to lock two 24" pipes and two 12" pipe coupling ends together, preventing the post from disassembly without a key.

A plurality of letter plasma cutouts 226 are disposed in the threaded pipes 204 and the LED light illuminates through the plasma cutouts enabling customization with team names or logos cut out in the post. The flag 222 can be attached using the anchor shackle pin tubular lock cylinders. An ornamental top piece 228 featuring a ¾" male threading on the bottom thereof is threaded for aesthetics of the modular flag display system 100. The flag post device 200 can include attachment of multiple flags using threaded carabiners, decorative accessories, and additional posts can be used to display additional flags.

Figure 3:
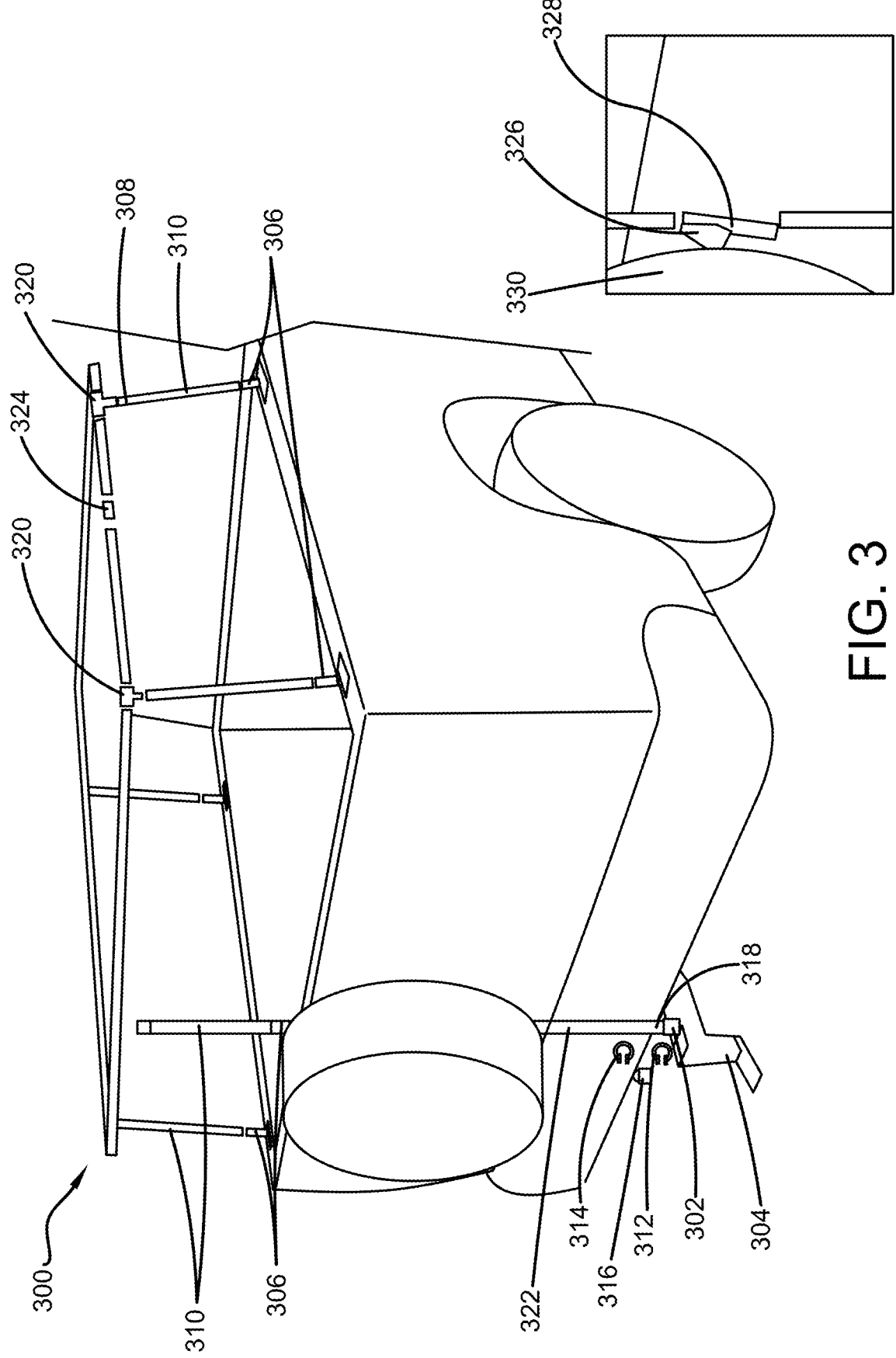
FIG. 3 illustrates a perspective view of truck bed rack of the present invention in accordance with one embodiment of the present invention.

FIG. 3 illustrates a perspective view of truck bed rack of the present invention in accordance with one embodiment of the present invention. In the present embodiment, the truck bed 300 is a versatile accessory designed for trucks for both everyday use and camping trips. The truck bed rack 300 when fully assembled can carry long items such as pipes, steel, or wood. The truck bed rack 300 can also be used to mount a pop-up tent for camping trips. The rack can be removed from the truck and placed on level ground for use in camping or as a table frame.

More specifically, the rack 300 includes a ¾ bottom side welded black API coupling 302 welded to the bottom center of the adjustable level hitch 304. A plurality of other couplings 306 function as joints for attaching additional ¾"×24" threaded pipes 308 in various configurations. Couplings 306 are also used on the ends of ¾"×12" threaded pipes 310 for forming a frame for the rack 300. A pair of eye holes 312, 314 are aligned flat and horizontally to each other, enabling a padlock 316 to loop through and lock both eye holes 312, 314 into the base padlock 316. This secures the ¾" female end couplings 312, 314 and the threaded end 318 of the ¾" (24 inch) pipe together.

A plurality of welded rope loops are disposed and each is adapted for attaching or receiving an anchor shackle for connecting to the grommets of flags as described earlier in the disclosure. A plurality of ¾" threaded pipe tees 320 are threaded and one of the threaded pipe tee connects 12" and 24" ¾" threaded pipes on top of the post 322. Each ¾" threaded pipe tee 320 also connects the 24" ¾" threaded pipe vertically and horizontally on the GHP full truck bed rack 300. A plurality of ¾" Black Threaded Nipples 324 are threaded on both sides in opposite directions to connect the ¾" threaded pipe tees together, integrating the flag post 322 with the truck bed rack 300.

Four ¾" black API 90 degree couplings 306 as described earlier are disposed at the corners of the rack 300, connecting to each 24" threaded pipe to form the corners of the rack. A spare tire mount carrier 326 features a bolt pin 328 for easy attachment and detachment of the mount 326 and is designed to minimize rattling by bracing up and outwards. A spare tire 330 is also mounted and tied down using three lug nuts provided with the spare tire mount carrier.

Figure 4:
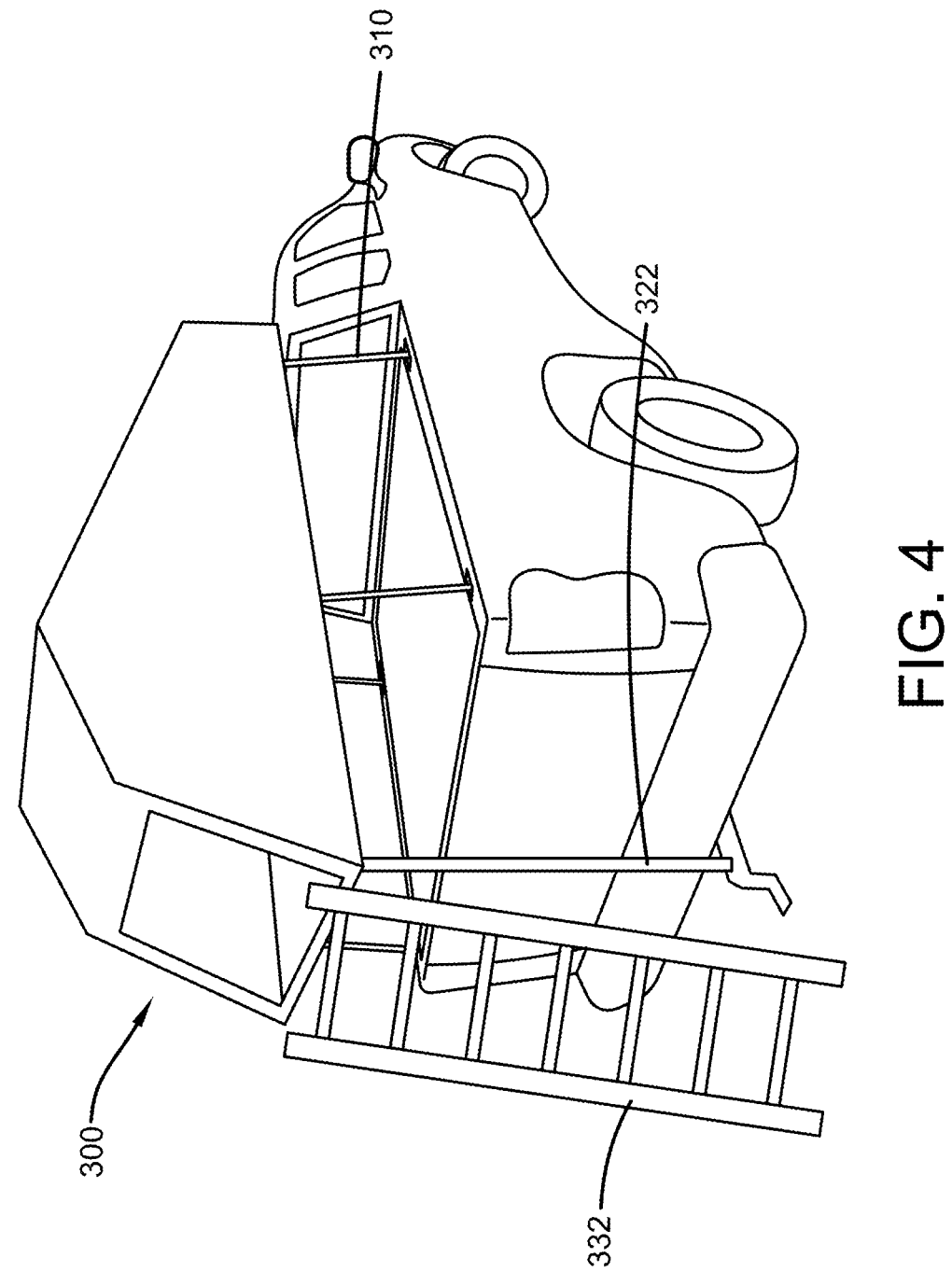
FIG. 4 illustrates a perspective view of installed truck bed rack with the flag post device of the present invention in accordance with one embodiment of the present invention.

Referring now to FIG. 4, a ladder 328 can be used when the bed 300 is in the installed position wherein the post 322 does not obstruct the use of the ladder 332. The bed 300 can be used for personal use and for carrying luggage items as well.

Figure 5:
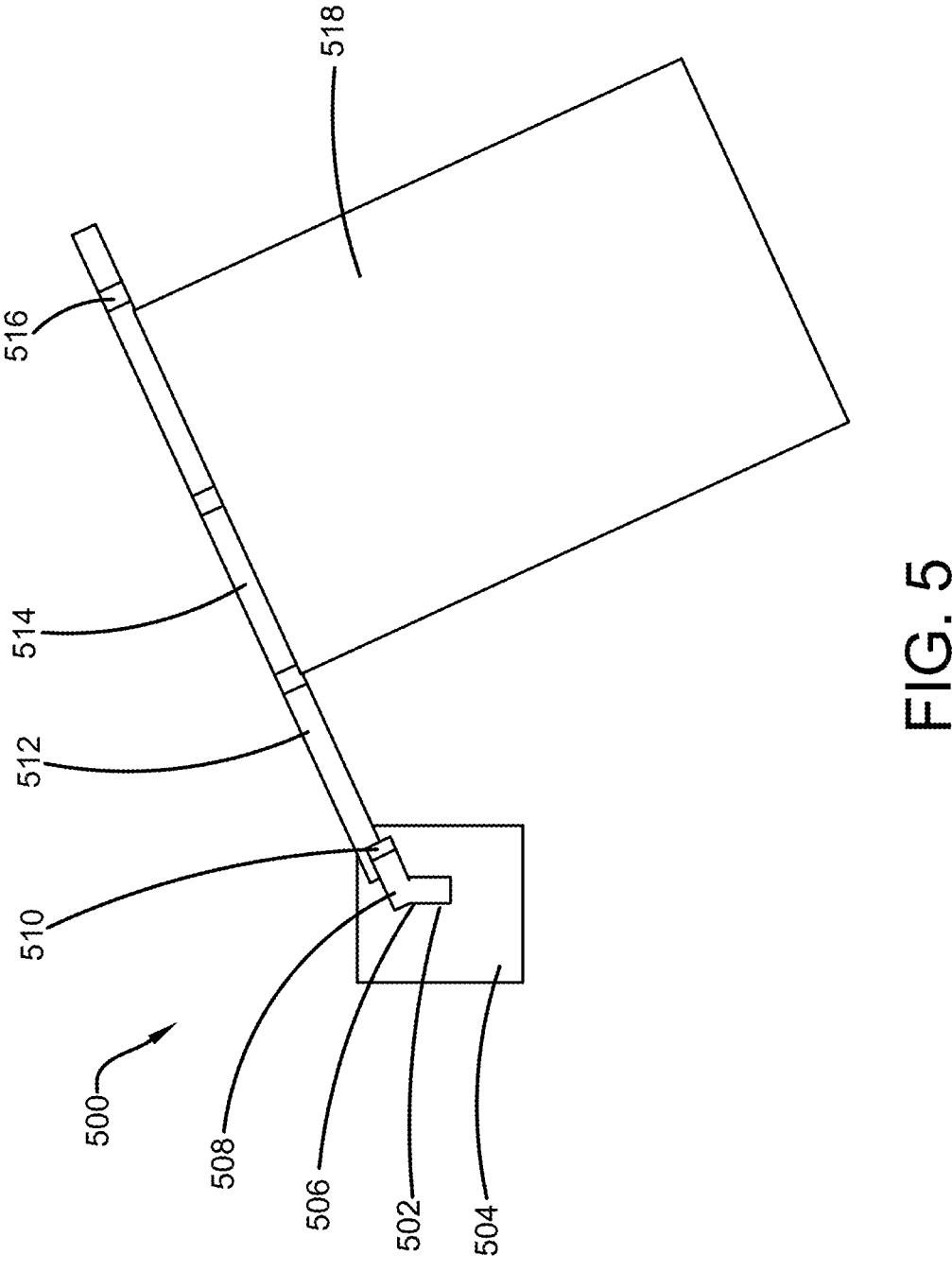
FIG. 5 illustrates a perspective view of another embodiment of the flag post device of the present invention for buildings in accordance with the disclosed structure.

FIG. 5 illustrates a perspective view of another embodiment of the secure and versatile flag mounting assembly of the present invention for buildings in accordance with the disclosed structure. A bracket mount 502 having LED plasma cut bracket 504 is designed to be positioned on wall of a building. The LED plasma cut 504 provides visual appeal and the back spacers ensure the mount 502 is securely fixed to the building. A Black API Coupling 506 and Glock Pistol 508 with Adjustable Pole Bracket 510 is included in the post device 500. The Glock Pistol design 508 is integrated with the ¾" coupling 506 and the coupling 506 is inserted and welded within the barrel of the Glock 508.

A flag post 512 is included in the modular flag display system 500 and can include a plurality of threaded pipes 514. Preferably, two 24" threaded pipes and one 12" pipe are used for the post 512. Welded rope loops 516 are disposed below each Black API Coupling for secure attachment of flags. The flag 518 is attached using anchor shackle pin tubular lock cylinders as described in other embodiments of the present invention.

The bracket mount 502 provides stability and resistance to high winds and the device 500 can also be threaded onto a ball hitch, enabling for adjustable flag positioning. The design and installation process of the device 100 are user-friendly, enabling consumers to update their flag poles on their property without professional assistance.

Figure 6:
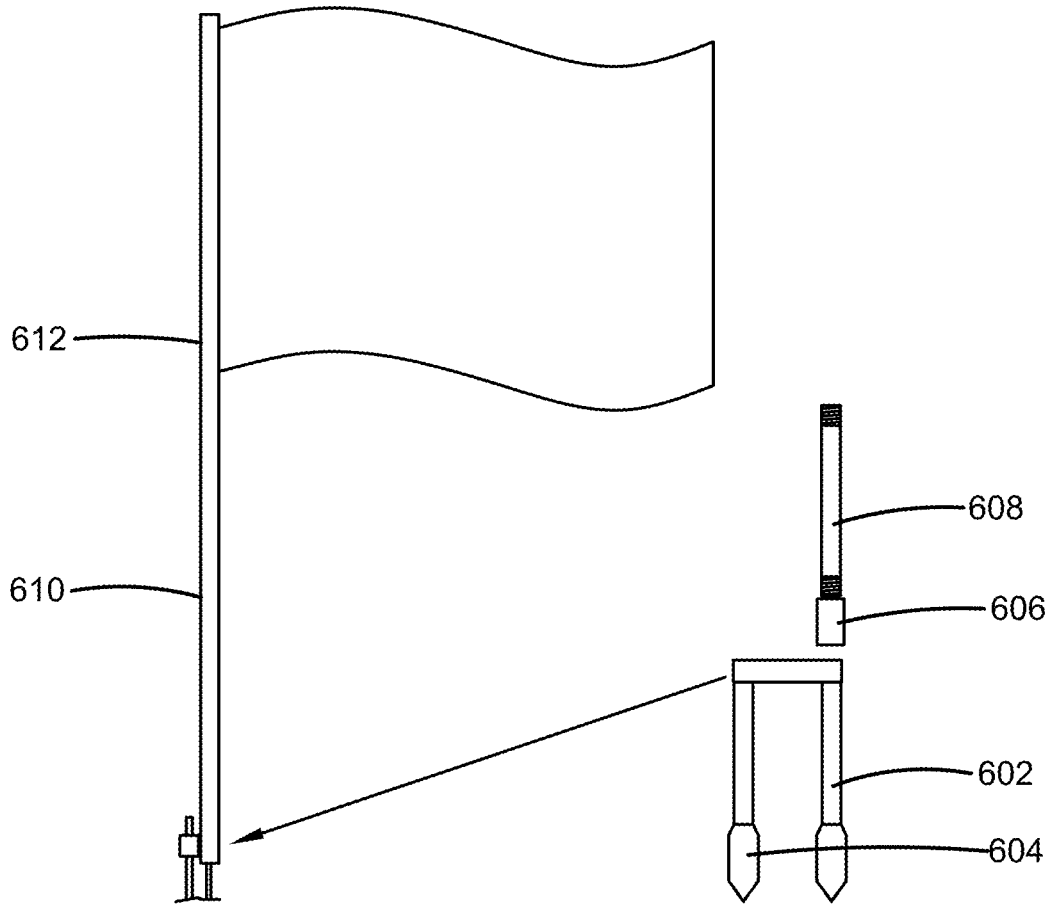
FIG. 6 illustrates a perspective view of a version of the flag post to stake in the ground in accordance with the disclosed structure.

FIG. 6 illustrates a perspective view of a version of the flag post to stake in the ground in accordance with the disclosed structure. In the present embodiment, the flag post 600 includes a pair of large stakes 602, 604. The large stakes 602, 604 are driven into the ground, providing a secure anchor point. At least one ¾" Bottom Side Welded Black API Coupling 606 is used for enabling attachment of one or more ¾"×24" threaded pipes 608. The threaded pipes 608 together form the flag post 610. The flag 612 can be securely attached to the flag post 610 using anchor shackle pin tubular lock cylinders (as described in other embodiments). The pins lock through the grommets of the flag, ensuring the flag stays attached even in windy conditions. It is to be appreciated that all references to ¾ inch pipes and couplers is for an exemplary dimension of an internal diameter of the pipes and couplers. Other exemplary pipe and coupler diameters can range from ¼ inch to 1½ inch.

Figure 7:
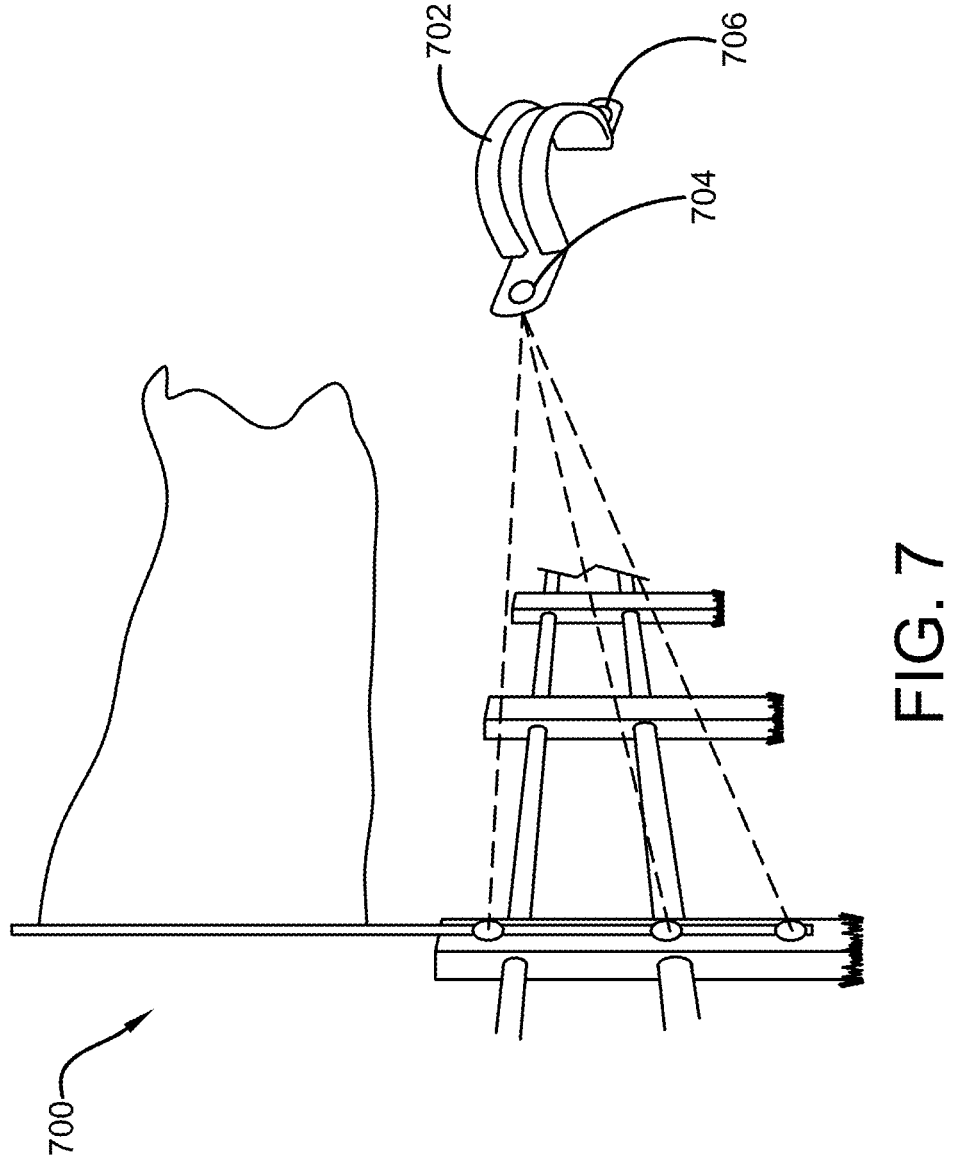
FIG. 7 illustrates a perspective view of a version of the flag post designed to be mounted to solid structures or posts in accordance with the disclosed structure.
Figure 8:
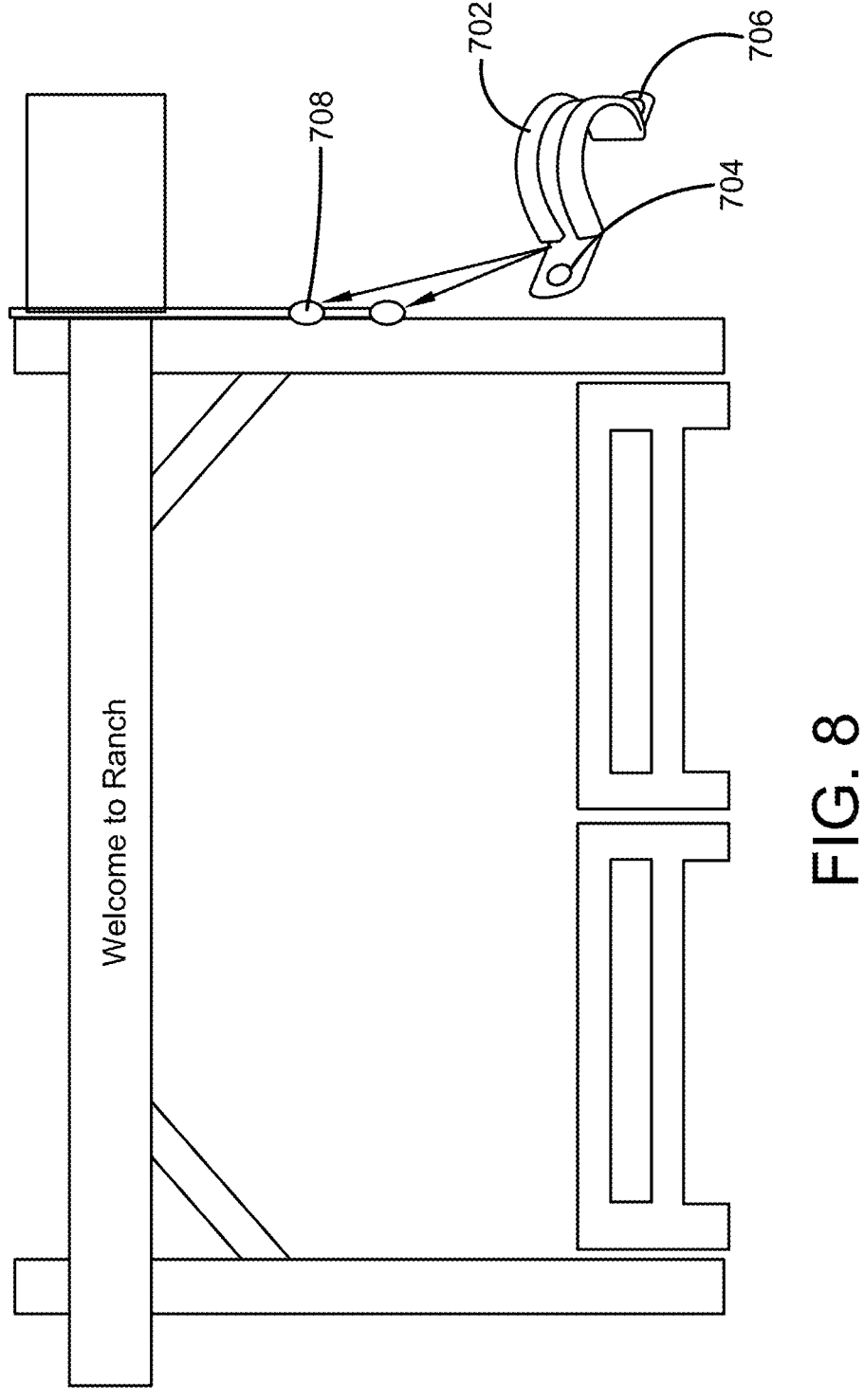
FIG. 8 illustrates a perspective view of a version of the flag post designed to be mounted to a gate in accordance with the disclosed structure.

FIG. 7 illustrates a perspective view of a version of the secure and versatile flag mounting assembly designed to be mounted to solid structures or posts in accordance with the disclosed structure. In the present embodiment, the flag post device 700 includes a plurality of metal clamps 702 which are used to mount the flag post to solid structures or posts. The clamps are made of durable aluminum and are designed to withstand high winds. Each clamp includes a pair of apertures 704, 706 which are adapted to receive a fastener each to fasten the clamp and to secure the flag post. The flag post 700 can also be mounted to a gate 708 of a farm using the clamps 702 as illustrated in FIG. 8.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "secure and versatile flag mounting assembly", "modular flag display system", "vehicle or trailer ball hitch receiver flag post", "flag post device", and "flag post" are interchangeable and refer to the modular flag post system 100 of the present invention.

Notwithstanding the forgoing, the modular flag post system 100 of the present invention can be of any suitable size and configuration as is known in the art without affecting the overall concept of the invention, provided that it accomplishes the above stated objectives. One of ordinary skill in the art will appreciate that the modular flag post system 100 as shown in the FIGS. are for illustrative purposes only, and that many other sizes and shapes of the modular flag post system 100 are well within the scope of the present disclosure. Although the dimensions of the modular flag post system 100 are important design parameters for user convenience, the modular flag post system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A combined ball hitch and flag post device comprising:
an adjustable level hitch having a hitch receiving portion and an adjustable height ball receiving portion;
a bottom side coupling;
a plurality of threaded pipes;
a plurality of couplings;
a plurality of loops; and
a plurality of shackles;
wherein said adjustable level hitch selectively attachable to a vehicle hitch receiver;
wherein said bottom side coupling secured to said hitch receiving portion for securing said plurality of threaded pipes to the vehicle;
wherein said plurality of threaded pipes having outer threading for securing to said plurality of couplings;
wherein said plurality of couplings threadable onto said plurality of threaded pipes for assembling a flag post;
wherein one of said plurality of shackles passing respectively through one of said plurality of loops;
wherein a bottom one of said plurality of threaded pipes having a first eyelet and wherein said bottom side coupling having a second eyelet; and
further wherein said first eyelet and said second eyelet threadable therethrough with a padlock for securing said flag post to said adjustable level hitch.

2. The combined ball hitch and flag post device of claim 1, wherein said padlock secures said flag post by locking said bottom one of said plurality of threaded pipes to said hitch receiving portion.

3. The combined ball hitch and flag post device of claim 2, wherein said plurality of loops are welded rope loops.

4. The combined ball hitch and flag post device of claim 3, further comprising a plurality of pin tubular lock cylinders, wherein each of said plurality of pin tubular lock cylinders locks said plurality of couplings and said plurality of threaded pipes.

5. The combined ball hitch and flag post device of claim 4, wherein each of said plurality of welded rope loops fastened to a corresponding one of said plurality of threaded pipes.

6. The combined ball hitch and flag post device of claim 5, wherein said plurality of shackles are selected from the group consisting of an anchor shackle and a threaded carabiner.

7. The combined ball hitch and flag post device of claim 3, wherein each of said plurality of welded rope loops positioned below a corresponding one of said plurality of couplings on each of said plurality of threaded pipes.

8. The combined ball hitch and flag post device of claim 7, wherein said plurality of shackles having attachment points for securing grommets of a flag.

9. A combined ball hitch and flag post device comprising:
an adjustable level hitch having a hitch receiving portion and an adjustable height ball receiving portion;
a bottom side coupling;
a plurality of threaded pipes;
a plurality of couplings;
a plurality of loops;
a plurality of shackles; and
a LED light
wherein said adjustable level hitch selectively attachable to a vehicle hitch receiver;
wherein said bottom side coupling secured to said hitch receiving portion for securing said plurality of threaded pipes to the vehicle;
wherein said plurality of threaded pipes having outer threading for securing to said plurality of couplings;
wherein said plurality of couplings threadable onto said plurality of threaded pipes for assembling a flag post;
wherein one of said plurality of shackles passing respectively through one of said plurality of loops;
wherein each of said plurality of loops fastened to a corresponding said plurality of threaded pipes;
wherein said plurality of shackles are selected from the group consisting of an anchor shackle and a threaded carabiner;
wherein each of said plurality of loops positioned below a corresponding one of said plurality of couplings on each of said plurality of threaded pipes;
wherein said plurality of shackles having attachment points for securing grommets of a flag;
wherein said plurality of threaded pipes having a plurality of cutouts; and
further wherein said plurality of threaded pipes having said LED light contained inside said plurality of threaded pipes for illumination of said plurality of cutouts.

10. The combined ball hitch and flag post device of claim 9, wherein said plurality of loops are welded rope loops.

11. The combined ball hitch and flag post device of claim 9, further comprising a plurality of pin tubular lock cylinders, wherein each of said plurality of pin tubular lock cylinders locks said plurality of couplings and said plurality of threaded pipes.

12. The combined ball hitch and flag post device of claim 9, wherein a bottom one of said plurality of threaded pipes having a first eyelet and wherein said bottom side coupling having a second eyelet, and further wherein said first eyelet and said second eyelet threadable therethrough with a padlock for securing said flag post to said adjustable level hitch.

13. The combined ball hitch and flag post device of claim 12, wherein said padlock secures said flag post by locking said bottom one of said plurality of threaded pipes to said hitch receiving portion.

14. The combined ball hitch and flag post device of claim 9, wherein said LED light having a dual-ended adapter for plugging into a vehicle's trailer lights plug.

* * * * *